United States Patent [19]

Kato et al.

[11] Patent Number: 4,669,419
[45] Date of Patent: Jun. 2, 1987

[54] BRINGING-UP APPARATUS FOR PROVIDING REPOSE PLACE FOR YOLK SAC FRY IN FRY CHANNEL

[76] Inventors: Hiroshi Kato, 1268-1, Tate-machi, Hachiouji-shi, Tokyo; Eiichi Nakamura, 23-12, Ooasa-Higashi-machi, Ebetsu-shi, Hokkaido, both of Japan

[21] Appl. No.: 716,659

[22] Filed: Mar. 27, 1985

[30] Foreign Application Priority Data

Apr. 4, 1984 [JP] Japan ................................. 59-68040

[51] Int. Cl.$^4$ ............................................ A01K 61/00
[52] U.S. Cl. ...................................................... 119/3
[58] Field of Search ............................................ 119/3

[56] References Cited

U.S. PATENT DOCUMENTS

| | | | |
|---|---|---|---|
| 518,319 | 4/1894 | Hoxsie | 119/3 |
| 1,007,383 | 10/1911 | Parry | 119/3 |
| 3,886,905 | 6/1975 | McNeil | 119/3 |
| 4,214,551 | 7/1980 | McNeil et al. | 119/3 |

Primary Examiner—Hugh R. Chamblee
Attorney, Agent, or Firm—Birch, Stewart, Kolasch and Birch

[57] ABSTRACT

A bringing-up apparatus is disposed in a channel having a fresh water inlet and outlet and provides in the channel areas of repose for yolk sac fry released to the channel. The bringing-up apparatus includes a plurality of groyne plates disposed in the channel such that they extend in a direction crossing the water flow in the channel and are spaced apart in the direction of the water flow for providing places of gentle water flow in the channel and also includes at least one support disposed on the bottom of the channel for supporting the groyne plates such that a space is maintained between adjacent groyne plates.

13 Claims, 4 Drawing Figures

BRINGING-UP APPARATUS FOR PROVIDING REPOSE PLACE FOR YOLK SAC FRY IN FRY CHANNEL

BACKGROUND OF THE INVENTION

1. Field of the Invention

This invention relates to a bringing-up apparatus disposed in a fry channel for accommodating the fry of salmon, such as pink salmon, masou salmon, trout, char or the like, particularly yolk sac fry in an early stage of development after breeding, and more particularly, to a bringing-up apparatus for providing a repose place for the yolk sac fry in the fry channel.

2. Description of the Prior Art

The incubation of salmon and similar fish usually comprises a breeding step, in which fertilized eggs are bred, a repose period protection step for protecting the yolk sac fry in a fry channel where fresh water flows gradually at all times, and a feed step, in which free swimming fry are fed in a free swimming period after the repose period.

The yolk sac fry during the repose period repose in a repose place in the fry channel where there is a gentle water flow, without substantially taking bait and also without moving. Therefore, in a fry channel where only fresh water flows gradually at all times, the yolk sac fry concentrate excessively in particular places such as the corners of the fry channel because the place where the water flow is gentle, i.e., place of repose of the yolk sac fry is scant in the fry channel. When a particular repose place is excessively crowded by the yolk sac fry, oxygen that is necessary for the yolk sac fry becomes insufficient which results in defective growth or death of the fry. For this reason, the capacity of the fry channel for the yolk sac fry has to be reduced.

Therefore, it is a usual practice to employ a fry channel, where small gravel free from the corners are laid over the bottom of the channel and fresh water flows gently at all time with a minimum depth of 7 to 8 cm and at a velocity of 3 cm/sec. The aim of this fry channel is to provide places where the water flow is gentle by laying gravel over the bottom to increase the place of repose of the yolk sac fry at the bottom so as to distribute the yolk sac fry over the bottom, provide sufficient oxygen to the distributed yolk sac fry and thus increase the capacity of accommodating the yolk sac fry.

Actually, however, the conditions of the place of repose provided by the gravel varies with the shape, size, amount, distribution or the like of the gravel that is laid. Therefore, there is a trend that the yolk sac fry concentrates in the best place of repose even in the fry channel as noted above, so that defective growth or death of the yolk sac fry due to insufficiency of available oxygen occurs. For this reason, it is necessary to reduce the capacity of accommodation of the yolk sac fry.

Further, the fry channel is cleaned after the free swimming fry have entered the free swimming stage after the repose period and have been transferred to a feeding channel for the next step. Where the gravel is laid over the fry channel, however, the gravel must be washed one by one. For these reasons, the cleaning requires a long time in addition to the fact that the cleaning and handling of gravel is very cumbersome. Further, sometimes the gravel which is to be laid over the fry channel bottom is not readily available.

Further, if the free swimming fry having attained the free swimming period after the repose period is not transferred to the feeding channel for the next step but the fry channel is used directly as the feeding channel, the bait for the free swimming fry is trapped among or attached to the gravel laid over the fry channel bottom because of the gravels remaining in the channel. The bait which thus remains in the channel corrodes or produces fur to contaminate the channel. In this case, the free swimming fry are more liable to catch diseases.

SUMMARY OF THE INVENTION

A primary object of the present invention is to provide a bringing-up apparatus, which can provide a place of repose for the fry, particularly the yolk sac fry in the fry channel, without the need of laying gravel over the bottom.

Another object of the present invention is to provide a bringing-up apparatus which can increase the capacity of the fry channel for accommodating the yolk sac fry.

A further object of the present invention is to provide a bringing-up apparatus which is capable of ready cleaning and handling.

A still further object of the present invention is to provide a bringing-up apparatus which permits use of a fry channel as a feeding channel without accumulation of spread bait so that the channel will never be contaminated by such bait.

A further object of the present invention is to provide a bringing-up facility, which comprises a fry channel where the fry is released and a bringing-up apparatus provided in the fry channel.

The bringing-up apparatus according to the present invention is provided in a fry channel which has a fresh water inlet and outlet and provides a place of repose for the yolk sac fry released to the channel. The bringing-up apparatus comprises a plurality of groyne plates extending in a direction of crossing the water flow in the fry channel and arranged at an interval in the direction of the water flow for providing a place of gentle water flow in the fry channel, and at least one support set on the bottom of the fry channel for supporting the groyne plates at an interval.

The bringing-up facility according to the present invention comprises, a fry channel with a fresh water inlet and outlet and a bringing-up apparatus provided in the fry channel for providing a place of repose of the yolk sac fry released to the fry channel, the bringing-up apparatus including a plurality of groyne plates extending in a direction of crossing the water flow in the fry channel and arranged at an interval in the direction of the water flow for providing a place of gentle water flow in the fry channel, and at least one support set on the bottom of fry channel for supporting the groyne plates at an interval.

The groyne plates used according to the present invention are disposed in the fry channel such as to prevent the water flow and thus provide places of gentle water flow, permitting the yolk sac fry to live in the place of the gentle water flow as the place of repose.

According to the present invention a plurality of groyne plates provide places of gentle water flow in a fry channel so as to protect yolk sac fry from the force of water. The groyne plates thus can provide a plurality of places of repose where the water flow is gentle without need of laying gravel in the fry channel.

According to the present invention, the plurality of places of repose provided by the groyne plates offer a substantially uniform condition of repose so that the yolk sac fry can be widely or substantially uniformly distributed over the fry channel. Thus, it is possible to increase the capacity of the fry channel to accommodate the yolk sac fry.

Further, the groyne plates can be readily taken out from the fry channel. Therefore, the groyne plates and fry channel can be readily cleaned, and the groyne plates can be more easily handled compared to gravel.

BRIEF DESCRIPTION OF THE DRAWINGS

The above and other features of the invention will become more apparent from the following description of the embodiment illustrated in the drawings, in which.

DESCRIPTION OF THE PREFERRED EMBODIMENT

Figure 1:
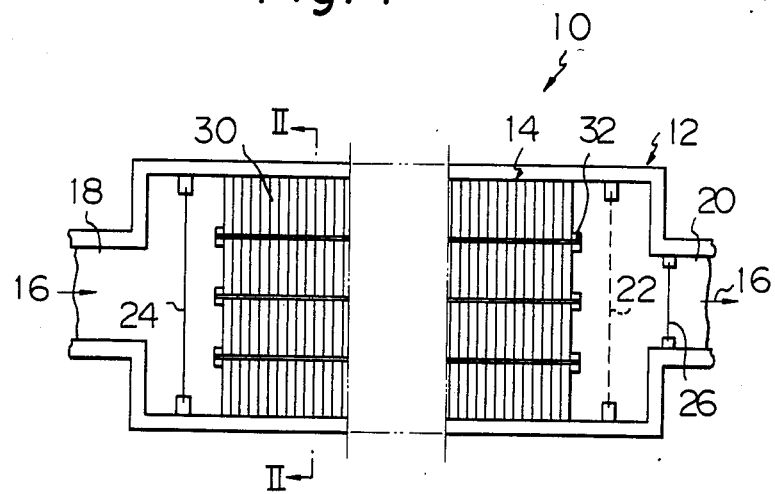
FIG. 1 is a plan view showing a bringing-up apparatus according to the present invention provided in a fry channel.
Figure 2:
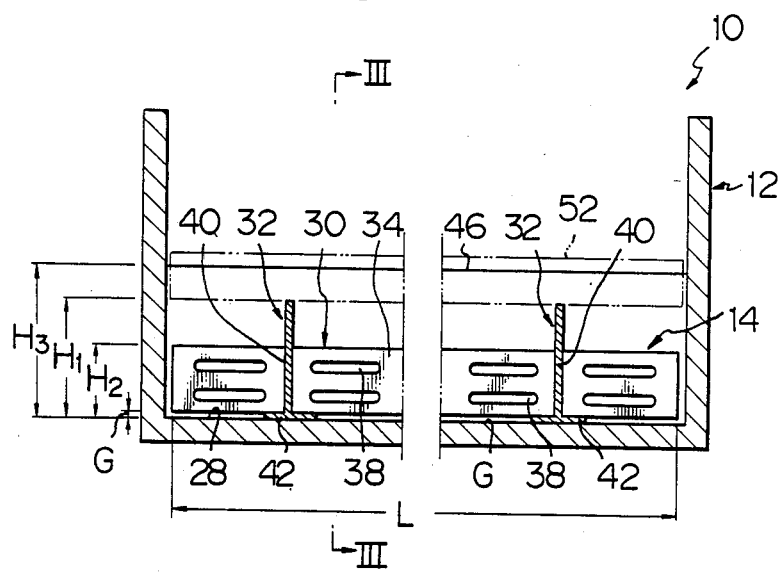
FIG. 2 is a sectional view taken along line II—II in FIG. 1.
Figure 3:
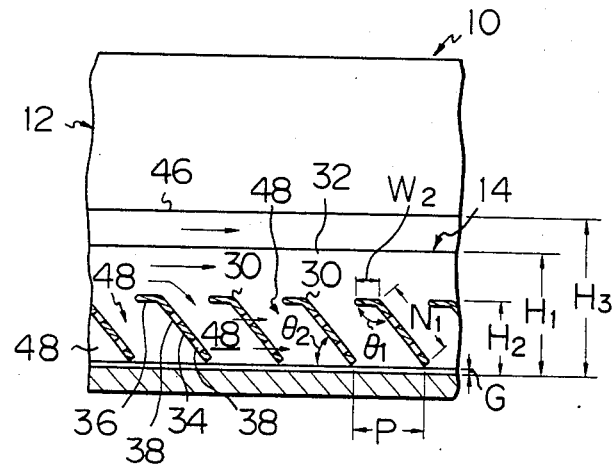
FIG. 3 is a sectional view taken along line III—III in FIG. 2.

Referring to FIGS. 1 to 3, there is shown a bringing-up facility 10, which comprises a fry channel 12 and a bringing-up apparatus 14 provided in the fry channel. The fry channel 12 is a shallow elongate channel with a length of 10 to 15 m and a width of 1.5 to 1.8 m, and water flows through the channel. The channel may be made of concrete. More specifically, fresh water 16 flows gently at all time into the channel 12 through an inlet 18 provided at one end and out of the channel 12 through an outlet 20 provided at the other end.

In the channel 12 a net screen 22 is provided to prevent yolk sac fry released to the channel 12 from flowing away therefrom through the outlet 20. The depth of the channel 12 can be adjusted by a drop structure 24 of flashboard provided in the channel and another drop structure 26 provided at the outlet 20.

The bringing-up apparatus 14 includes a plurality of groyne plates 30 serving to reduce the force or velocity of water flow to prevent the yolk sac fry released to the channel 12 from being carried along by the water flow and a plurality of elongate supports 32 set on the bottom 28 of the channel for supporting the groyne plates 30. The groyne plates 30 extend in a direction of crossing the direction of water flow in the channel 12 to provide places of gentle water flow. They are supported by the supports 32 at an interval provided in the direction of the water flow. The supports 32 are disposed in the channel 12 at an interval in the direction substantially parallel to the direction of the water flow.

Figure 4:
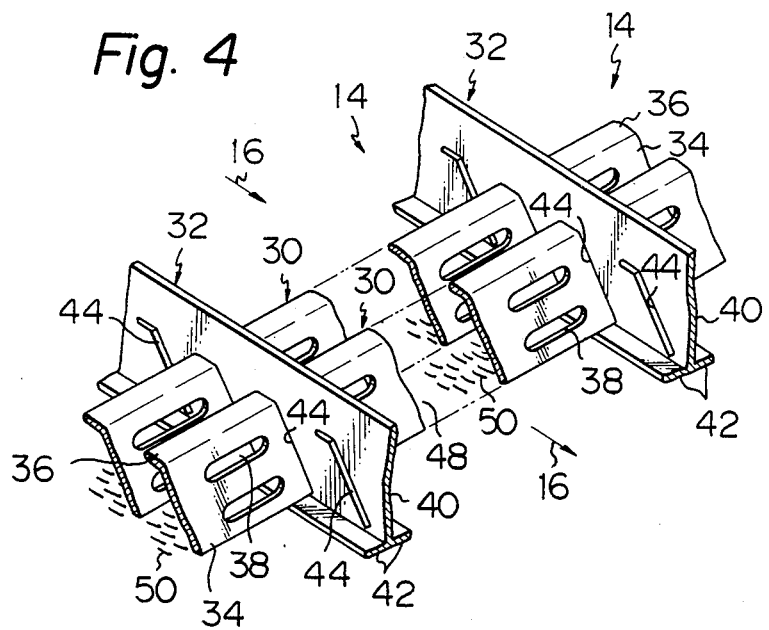
FIG. 4 is a fragmentary perspective view, to an enlarged scale, showing the bringing-up apparatus according to the present invention.

As shown in FIGS. 3 and 4, each of the groyne plates 30 consists of a strip-like inclined portion 34 and a visor-like portion 36 extending in one direction from one edge of the width direction of the inclined portion 34. The inclined portion 34 has a plurality of holes 38 formed at intervals in the longitudinal direction and width direction. In the illustrated embodiment, the holes 38 are slots extending in the longitudinal direction. However, the holes may be slots extending in the width direction of the inclined portion 34 or round holes or holes of any other shape.

As shown in FIG. 4, the supports 32 each have a substantially upright strip-like support portion 40 and a base portion 42 substantially perpendicular to and supporting the support portion 40. Thus, the support 32 has a substantially inverted T-shaped sectional profile. The support portion 40 has a plurality of holes or openings 44 having a shape complementary to the sectional profile and capable of receiving the groyne plates 30 and extending in the width direction of the support 32 and spaced apart in its longitudinal direction. Each hole 44 having the complementary shape to the sectional profile of the groyne plate 30, has a first portion corresponding to the inclined portion 34 of the groyne plate 30, extending in an upwardly inclined direction from the base portion 42, and a second portion corresponding to the visor-like portion 36 extending substantially horizontally from the top of the first portion.

The groyne plates 30 and supports 32 are made of such material as synthetic resins, metals and wood.

As for the dimensions of the individual parts of the bringing-up apparatus 14, the length L of the groyne plate 30 (see FIGS. 2 and 3) is substantially equal to the width of the fry channel 12, the width W1 of the inclined portion 34 of the groyne plate may be 30 mm, the width W2 of the visor-like portion 36 of the groyne plate may be 10 mm, the angle $\theta_1$ between the inclined portion 34 and visor-like portion 36 may be 135 degrees, the height H1 of the support 32 may be 50 mm, the pitch P of the holes 44 may be 30 to 50 mm, preferably 40 mm, the inclination angle $\theta_2$ of the first portion of the hole 44 corresponding to the inclined portion 34 of the groyne plate with respect to the bottom 28 of the channel, i.e., water surface 46, may be preferably 40 to 60 degrees, more preferably 45 to 55 degrees and most preferably 45 degrees, the width of the hole 38 may be 3 mm, the length of the hole 38 may be 30 mm, and the pitch of the holes 38 in the longitudinal direction of the groyne plate 30 may approximately be 50 mm.

It is to be noted that the inclination angle $\theta_2$ may be larger than 20 degrees and smaller than 90 degrees. It is preferable to provide the inclined portion 34 with extensive visor-like portion 36 where the inclination angle $\theta_2$ is larger, and with shorter visor-like portion 36 where the angle $\theta_2$ is smaller.

To dispose the bringing-up apparatus 14 in the fry channel 12 for using the channel 12 as the channel, the apparatus 14 is first assembled either inside or outside the channel 12. The bringing-up apparatus 14 can be assembled by inserting the groyne plates 30 through the holes 44 of the supports 32. The groyne plates 30 are thus supported by the supports 32 at an interval in the longitudinal direction of the supports, and the supports 32 are disposed at an interval in the longitudinal direction of the groyne plates 30.

The assembled bringing-up apparatus 14 is disposed in the channel 12 such that the supports 32 extend in the longitudinal direction of the channel 12 with their visor-like portion 36 on the upstream side and that the base portion 42 of the supports 32 is in contact with the bottom 28 of the channel 12. The groyne plates 30 are thus arranged such that their inclined portion 34 is inclined toward the upstream side with respect to the water surface 46 and that they extend across the water flow through the channel 12 and spaced apart a distance in the direction of water flow through the channel 12. The visor-like portion 36 extends toward the upstream side. Between the bottom 28 of the channel 12 and each groyne plate 30 is formed a gap G as shown in FIGS. 2 and 3, having a dimension corresponding to the thickness of the base portion 42 of the support 32. The height H2 of the groyne plate 30 from the bottom 28 of the channel is approximately 28 mm.

It is possible to dispose the bringing-up apparatus 14 in the channel 12 such that the visor-like portion 36 of the groyne plate 30 is directed to the upstream side.

Fresh water 16 is supplied to the channel 12, in which the bringing-up apparatus 14 is disposed, through the inlet 18, and the depth H3 of water is adjusted by the drop structures 24 and 26 at least to 7 to 8 cm. The fresh water 16 may be supplied to the channel 12 either before or after disposing the bringing-up apparatus 14 in the channel 12.

The fresh water supplied to the channel 12 flows gently and without stagnation at all times at a velocity of approximately 3 cm/sec. to the direction of the outlet 20 through the space above the groyne plates 30, holes 38 in the inclined portion 34 thereof and gap G between the bottom 28 of the channel and groyne plates 30. Since the groyne plates 30 are disposed such as to block the water flow, they form places 48 of gentle water flow between adjacent groyne plates 30.

Thus, when yolk sac fry 50 bred in a trough are transferred to the channel 12 in which the bringing-up apparatus 14 is disposed, the yolk sac fry settle to live in the places 48 that are subject to reduced water forces owing to the groyne plate 30 as the place of repose as shown in FIG. 4. In this case, since the places 48 of reduced water force are provided uniformly over the entire area of the channel 12 and the conditions for repose, e.g., darkness and velocity of water flow in the places 48, are more uniform compared to the case of the place of repose provided by gravel as in the prior art, the yolk sac fry 50 are distributed substantially uniformly over the entire area of the channel bottom 28 and live in a substantially ideal state of distribution. Thus, sufficient oxygen can be supplied to the yolk sac fry, so that it is possible to increase the capacity of the channel 12 to accommodate the yolk sac fry.

Instead of transferring the yolk sac fry having been bred in the trough to the channel 12, one or two layers of fertilized eggs or eyed eggs having been picked and obtained therefrom in the trough may be transferred to a single, or an array of screen trays 52, which are then put on the supports 32 in the channel 12, as shown by phantom lines in FIG. 2, thus permitting the yolk sac fry bred in the trays 52 to pass through the screen thereof by itself to thereby release the fry to the channel 12.

After the fry (i.e., free swimming fry) have grown from the yolk sac fry 50 to the free swimming stage in the channel 12 have been transferred to a feeding channel, the bringing-up facility 10 may be cleaned as follows. First, the bringing-up apparatus 14 is removed from the channel 12, and then the channel 12 is cleaned. Then the bringing-up apparatus 14 is disassembled into the groyne plates 30 and supports 32, which are then washed individually. In this way, the channel 12 and bringing-up apparatus 14 can be readily washed. Further, the groyne plates 30 and supports 32 disassembled from the bringing-up apparatus 14 may be stored in a warehouse after cleaning and be reassembled when they are used again. The bringing-up apparatus 14 thus can be readily handled.

When using the channel 12 both as incubation and feeding channels, the bringing-up apparatus 14 may be removed from the channel 12 by raising it when the yolk sac fry 50 in the channel 12 has reached the free swimming period after the repose period. Again in this case, the bringing-up apparatus 14 removed from the channel 12 is disassembled into the groyne plates 30 and supports 32, which are then cleaned and stored in the warehouse.

What is claimed is:

1. A bringing-up apparatus disposed in a channel having a fresh water inlet and outlet for providing in the channel places of repose for yolk sac fry released to the channel, comprising:

a plurality of groyne plates disposed in said channel such that said groyne plates extend in a direction crossing the water flow in the channel and are spaced apart in the direction of said water flow for providing places of gentle water flow in said channel, said groyne plates each having a strip-like inclined portion disposed in said channel in an inclined state toward the upstream side with respect to the water surface and said groyne plates each having a plurality of holes formed at an interval in the longitudinal direction of said inclined portion; and at least one support disposed on a bottom of said channel and supporting said groyne plates such that a space is maintained between adjacent groyne plates.

2. The apparatus according to claim 1, wherein said groyne plates each include a visor-like portion extending from one edge of said inclined portion toward the upstream side.

3. The apparatus according to claim 1, wherein the angle of inclination of said inclined portion with respect to said water surface is larger than 20 degrees and smaller than 90 degrees.

4. The apparatus according to claim 1, wherein said groyne plates each have a plurality of holes formed at intervals in the longitudinal direction and width direction of said inclined portion.

5. The apparatus according to claim 4, wherein said holes are slots extending in the longitudinal direction of said inclined portion.

6. The apparatus according to claim 1, wherein said support extends across said groyne plates and has a plurality of holes for receiving said groyne plates, said holes extending in the width direction of said support and spaced apart in the longitudinal direction thereof.

7. The apparatus according to claim 6, wherein said support includes a substantially upright plate-like support portion and a base portion put on the bottom of the channel and supporting said support portion substantially perpendicular to said base portion, said holes being provided in said support portion.

8. The apparatus according to claim 7, wherein said holes formed in said support are inclined toward the upstream side so that they can receive said groyne plates.

9. A bringing-up apparatus disposed in a channel having a fresh water inlet and outlet for providing in said channel places for repose of yolk sac fry in said channel, comprising:

a plurality of groyne plates disposed in said channel such that they extend in a direction crossing the water flow in the channel and are spaced apart in the direction of said water flow for providing places of gentle water flow in said channel;

a plurality of supports extending in the direction of said water flow and spaced apart in a direction crossing said water flow for supporting said groyne plates such as to provide spaces between adjacent groyne plates;

said groyne plates each including a plate-like inclined portion disposed in said channel and inclined toward the upstream side with respect to the water surface and a visor-like portion extending from one edge of the width direction of said inclined portion toward the upstream side, said inclined portion having a plurality of slots or openings spaced apart in the longitudinal direction and width direction and extending in the longitudinal direction of said inclined portion; and said supports each having a substantially upright plate-like support portion and a base portion put on the bottom of the channel and supporting said support portion perpendicular to said base portion, said support portion having a plurality of holes spaced apart in the longitudinal direction for receiving said groyne plates, said holes each having a first portion corresponding to said inclined portion of the groyne plate and extending inclinedly upwardly from the end on the side of said base portion toward the upstream side and a second portion corresponding to said visor-like portion of the groyne plate and extending from said first portion toward the upstream side.

10. A bringing-up facility comprising:

a channel having a fresh water inlet and outlet; and a bringing-up apparatus disposed in said channel and providing for places of repose for yolk sac fry released to said channel;

said bringing-up apparatus including a plurality of groyne plates disposed in said channel such that said groyne plates extend in a direction crossing the water flow in the channel and are space apart in the direction of said water flow for providing plates of gentle water flow in said channel, said groyne plates each having a strip-like inclined portion disposed in said channel in an inclined state toward the upstream side with respect to the water surface and said groyne plates each having a plurality of holes formed at an interval in the longitudinal direction of said inclined portion; and at least one support disposed on the bottom of said channel and supporting said groyne plates such that a space is maintained between adjacent groyne plates.

11. The bringing-up facility according to claim 10, wherein the angle of inclination of said inclined portion with respect to said water surface is larger than 20 degrees and smaller than 90 degrees.

12. The bringing-up facility according to claim 11, wherein the angle of inclination is larger than 40 degrees and smaller than 60 degrees.

13. A bringing-up apparatus disposed in a channel having a fresh water inlet and outlet for providing in the channel places of repose for yolk sac fry released to the channel, comprising:

a plurality of groyne plates having a plurality of holes therein disposed in said channel such that said groyne plates extend in a direction crossing the water flow in the channel and are spaced apart in the direction of said water flow for providing places of gentle water flow in said channel; and at least one support disposed on the bottom of said channel and supporting said groyne plates such that a space is maintained between adjacent groyne plates;

said groyne plates each having a strip-like inclined portion disposed in said channel in an inclined state toward the upstream side with respect to the water surface;

the angle of inclination of said inclined portion with respect to said water surface being larger than 40 degrees and smaller than 60 degrees.

* * * * *